United States Patent
Kwok

(10) Patent No.: US 10,630,325 B2
(45) Date of Patent: Apr. 21, 2020

(54) SYSTEMS AND METHODS FOR DETECTING AND DETERRING SIGNAL ATTENUATION FROM PHASED-ARRAY ANTENNA SYSTEMS

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 100 days.

(21) Appl. No.: 15/685,773

(22) Filed: Aug. 24, 2017

(65) Prior Publication Data

US 2018/0358991 A1  Dec. 13, 2018

Related U.S. Application Data

(60) Provisional application No. 62/517,790, filed on Jun. 9, 2017.

(51) Int. Cl.
*H04B 1/04* (2006.01)
*G06F 3/00* (2006.01)
(Continued)

(52) U.S. Cl.
CPC ........... *H04B 1/0475* (2013.01); *G06F 3/005* (2013.01); *G08B 21/22* (2013.01); *H01Q 1/02* (2013.01);
(Continued)

(58) Field of Classification Search
CPC ........... G06F 3/005; G06F 2203/04105; G06F 3/0428; G08B 21/22; H04B 1/0475
See application file for complete search history.

(56) References Cited

U.S. PATENT DOCUMENTS 9,214,721 B2 * 12/2015 Israel ................. H01Q 1/38
2007/0238496 A1 * 10/2007 Chung ................ H04B 1/3838
455/575.7
(Continued)

FOREIGN PATENT DOCUMENTS

| JP | 2013214868 A | 10/2013 |
| KR | 1020060073661 | 6/2006 |
| KR | 1020080048252 A | 6/2008 |

OTHER PUBLICATIONS

The PCT Search Report and Written Opinion dated Sep. 12, 2018, for PCT Application No. PCT/US2018/034934, 11 pages.

*Primary Examiner* — Khanh C Tran
(74) *Attorney, Agent, or Firm* — Lee & Hayes, P.C.

(57) ABSTRACT

A high-frequency antenna, such as may be implemented in a mobile computing device, is sensitive to obstructions that interfere with, and attenuate, a signal emanating therefrom. In fact, in mobile communication devices, such as cellular telephones, a user's hand, or even clothing, can attenuate the signal to cause a noticeable degradation in the quality of service of the device. To alleviate this, a mobile computing device is configured to detect the attenuation and provide a notification to a user to alleviate the situation. In some cases, the user is prompted to hold the mobile computing device in a different orientation in order to remove the obstruction. The prompting may be provided through visual, audio, haptic, or other types of feedback, including dispersing heat generated by the mobile computing device near the antenna location so it become uncomfortable for the user to hold the device in a way that interferes with the antenna system.

20 Claims, 5 Drawing Sheets

(51) Int. Cl.
  *G08B 21/22* (2006.01)
  *H04M 1/725* (2006.01)
  *H01Q 1/02* (2006.01)
  *H01Q 1/12* (2006.01)
  *H01Q 1/24* (2006.01)
  *H04M 1/02* (2006.01)
  *H04B 1/034* (2006.01)
  *H01Q 3/26* (2006.01)

(52) U.S. Cl.
  CPC ........... *H01Q 1/1257* (2013.01); *H01Q 1/243* (2013.01); *H04M 1/725* (2013.01); *H04M 1/72569* (2013.01); *G06F 2203/04105* (2013.01); *H01Q 3/2676* (2013.01); *H04B 1/0343* (2013.01); *H04M 1/026* (2013.01)

(56) References Cited

U.S. PATENT DOCUMENTS

| | | | |
|---|---|---|---|
| 2009/0096683 A1* | 4/2009 | Rosenblatt | H01Q 1/242 343/702 |
| 2009/0284415 A1* | 11/2009 | Worl | H01Q 21/061 342/372 |
| 2011/0159920 A1 | 6/2011 | Lehmann | |
| 2012/0311357 A1* | 12/2012 | Andrews | G06F 1/206 713/320 |
| 2014/0099991 A1* | 4/2014 | Cheng | G06F 3/017 455/550.1 |
| 2014/0240179 A1 | 8/2014 | Kim et al. | |
| 2015/0179043 A1* | 6/2015 | Gude | H04B 17/318 455/226.2 |
| 2015/0200463 A1* | 7/2015 | Heikura | H01Q 1/245 455/73 |
| 2015/0255994 A1* | 9/2015 | Kesler | H02J 5/005 307/10.1 |
| 2016/0013547 A1* | 1/2016 | Tishin | H01Q 7/00 343/873 |
| 2017/0099726 A1* | 4/2017 | Elliott | H05K 1/0204 |
| 2017/0104266 A1* | 4/2017 | Ramachandran | H01Q 1/48 |
| 2017/0310805 A1* | 10/2017 | Dai | H04M 1/725 |
| 2018/0115054 A1* | 4/2018 | Wu | H01Q 5/35 |

* cited by examiner

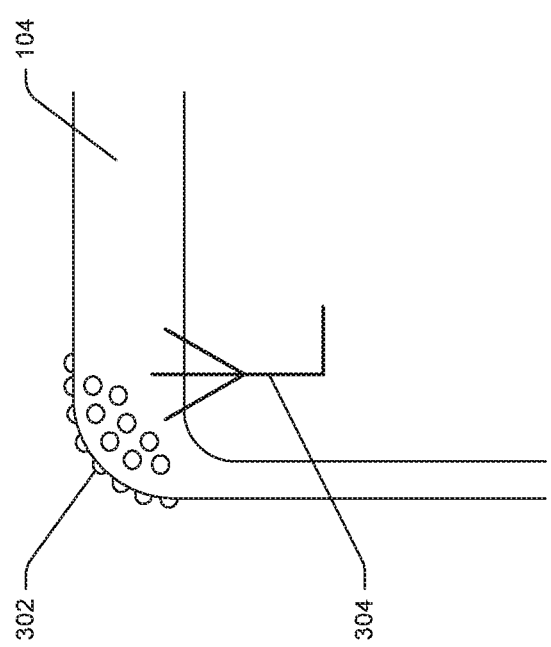
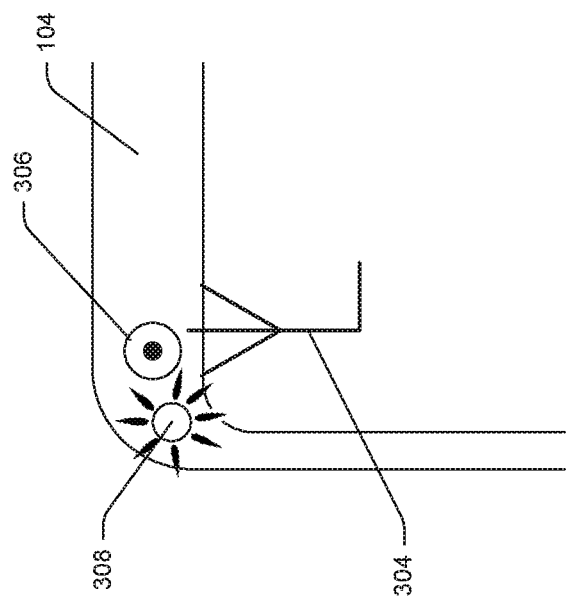

SYSTEMS AND METHODS FOR DETECTING AND DETERRING SIGNAL ATTENUATION FROM PHASED-ARRAY ANTENNA SYSTEMS

CROSS REFERENCE TO RELATED APPLICATION

This patent application claims the benefit of U.S. Provisional Patent Application Ser. No. 62/517,790 filed Jun. 9,2017 , entitled "PASSIVE AVOIDANCE OF 5G ANTENNA BLOCKAGE ", which is hereby incorporated in its entirety by reference.

BACKGROUND

As mobile wireless communication devices continue to become increasingly ubiquitous, the demand for data bandwidth likewise continues to increase. Moreover, users of wireless communication devices continually demand increased bandwidth which, when combined with the increasing number of wireless communication devices in service, strains the data limits of a radio access provider's ability to meet the demand. Moreover, machine-to-machine communications are becoming increasingly common, thereby adding additional bandwidth requirements to an already strained infrastructure.

As such, radio access providers are continually striving to improve the relevant technologies that can meet the increased bandwidth, smaller size, and reduced power requirements that will be required to meet the even increasing demands for data and bandwidth demands.

One promising avenue of technological advancement is in the area of antenna design. According to some, a high frequency array antenna system, such as a phased-array system, is the best bet for providing more mobile users, enabling new services and technologies to operate on the same frequency, and provide data speeds that are orders of magnitude faster than are currently available. However, in many cases, a high frequency antenna system has a relatively short propagation distance. As such, a signal emanating from a high-frequency antenna is easily attenuated. Signal attenuation leads to reduced data speeds, dropped voice calls, and a reduction in the overall quality of service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3A illustrates embodiments of one example of a passive deterrent to obstructions to a wireless signal broadcast from a mobile computing device.

FIG. 3B illustrates example active detecting and deterrent of obstructions to a wireless signal broadcast from a mobile computing device.

DETAILED DESCRIPTION

Figure 1:
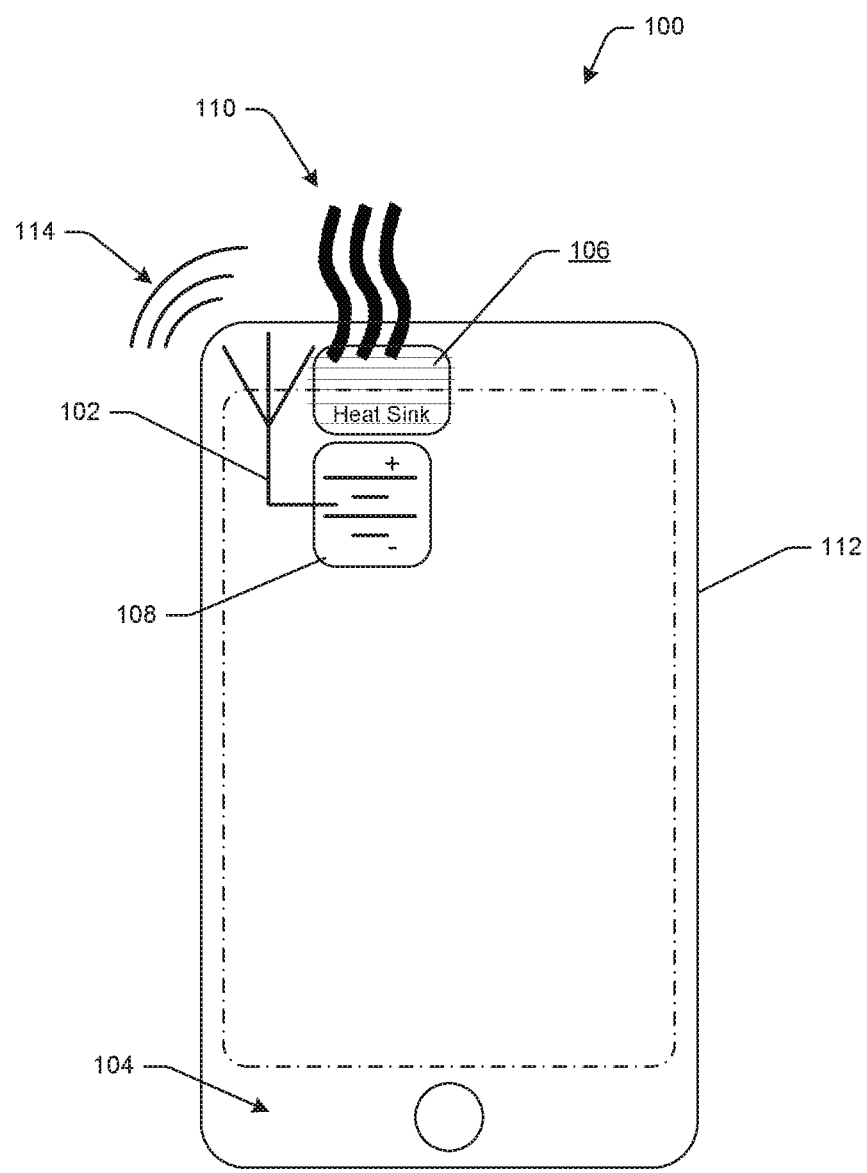
FIG. 1 illustrates an overview of a system for deterring signal attenuation from an antenna system.

This disclosure describes, in part, systems and methods for detecting and deterring signal attenuation from antenna systems, such as a phased-array antenna system. As technology applicable to mobile computing continues to evolve, such as wireless communication, some of the key considerations are bandwidth and device size. There is an ever increasing demand for more bandwidth. While additional bandwidth may generally be available, being able to realize the additional bandwidth in a small device and/or with small antennas can be problematic.

One area of development that appears to satisfy both demands for increased bandwidth and small size is the development and implementation of a phased-array antenna system. A phased-array is an array of antennas that work together to create a beam of radio waves that can be electronically steerable without physically reorienting the antennas. The radio frequency current is delivered from a transmitter to the antennas with a phase relationship so that the radio waves from the separate antennas constructively interfere to increase the radiation in a desired direction and destructively interfere to suppress the radiation in undesired directions.

An antenna array may have multiple elements, such as 4, 8, 16, 24 or more elements depending on the application. In some applications that require extremely high gain, thousands of individual antenna elements may be used. An antenna array typically consists of many small antenna elements arranged in an array. The array may be two-dimensional, that is, the antenna elements may be arranged side by side in a common plane. An array may also be three-dimensional, with two or more rows of antenna elements stacked to form a three-dimensional grid. Because of the typical small physical nature of the antenna elements used in an array, to achieve a high gain, phased arrays are usually implemented at the high-frequency end of the radio spectrum and may operate at radio frequencies in the millimeter wavelength band. At this wavelength, millimeter waves occupy the frequency spectrum from about 30 Ghz to 300 GHz, roughly occupying the spectrum between microwaves and infrared waves. A typical wavelength is within about the 1 mm to 10 mm range.

Radio waves within this frequency band have a relatively short propagation distance, especially when compared with earlier wireless communication technologies. For example, the Universal Mobile Telecommunications System ("UNITS") third generation ("3G") frequency bands are within about 1900 MHz to about 2200 MHz which have a wavelength of about 10 cm to 100 cm, or several orders of magnitude above the millimeter wavelengths.

In free space, electromagnetic waves propagate according to the inverse square law which provides that the power density of the wave is proportional to the inverse of the square of the distance from the source. In other words, doubling the propagation distance reduces the power to one fourth of the original power density. The power density of an electromagnetic wave is further attenuated by line of sight obstructions.

Any obstructions within the line of sight between an antenna and a receiver will have an effect on the level of the received signal. The effect of line of sight obstruction is exacerbated at high frequencies, and typically, the higher the frequency, the more degradation will occur from an obstruction. In fact, in mobile communication devices such as cellular telephones, a user's hand or even clothing, can attenuate the signal to cause a noticeable degradation in the quality of service.

As used herein, quality of service ("QoS") is a measure of the overall performance of a service, and is used to refer to all forms of wireless communication, which include voice and data communication. More specifically, QoS can relate to one or more of audio quality, video quality, latency, buffering, download speed, upload speed, resolution, response time, signal-to-noise ratio, echo, interrupts, crosstalk, loudness levels, packet prioritization, packet loss, bit rate, bit error rates, or any combination and generally is at least partially responsible for the customer experience over a wireless communications network.

The following description provides implementations for detecting and deterring attenuation of the signal sent by a mobile computing device. In many cases, the attenuation of the signal is introduced by a user of the mobile computing device. For example, a user may hold the mobile computing device at a location that interferes with the antenna of the mobile computing device. Similarly, the user may be wearing clothing, such as a hat or be holding an umbrella or other object that interferes with the line of sight signal propagation of the mobile computing device. This problem is exacerbated in extremely high frequency (EHF) situations, such as where a mobile computing device utilizes a phased-array antenna to transmit signals.

According to an embodiment, a system is configured to deter signal strength attenuation from an antenna. The system includes a mobile computing device having a housing, and further includes one or more heat generating components disposed within the housing. A phased-array antenna is also disposed within the housing. A heat sink is in the housing and is located adjacent to the phased-array antenna and is also in thermal communication with the one or more heat generating components. The heat sink is configured to transfer heat away from the one or more heat generating components and cause an increase in a temperature of the mobile computing device at a location on the housing adjacent the phased-array antenna. A user is thus deterred from holding the mobile computing device at the location of increased temperature, which would cause an obstruction to the signal broadcast from the antenna.

The system may further include a touch sensor configured to a touch on the housing adjacent the phased-array antenna. The touch sensor therefore can detect when a user is holding the mobile computing device in a manner that causes an obstruction to the antenna and an attenuation of the signal broadcast from the antenna.

According to an embodiment, the system further includes a first surface texture on the housing and a second surface texture on the housing, the second surface texture being located adjacent the phased-array antenna and providing a different tactile sensation than the first surface texture. Thus, a user can feel a location where the mobile computing device should not be held.

In some instances, the mobile computing device includes one or more processors and memory storing instructions that, when executed by the one or more processors, cause the mobile computing device to detect an obstruction to a signal emanating from the phased-array antenna, and provide a notification indicating the presence of the obstruction. The notification may be a visual notification and can be a light emanating from a light emitter associated with the mobile computing device, or a notice provided on a display of the mobile computing device, or a combination. As an example, a notice provided on a display may be textual, and may include an explanation of the obstruction and how to alleviate it. The notice on the display may also be graphical, such as showing an icon or graphic indicating the obstruction and how to remedy the situation.

The instructions can further cause the system to determine that the obstruction has not been removed and provide an escalated notification. The escalated notification can be a different sensory notification, a combination of multiple notifications, or the notification having a different intensity or frequency, or a combination of notifications. The notification can be an audible notification delivered from a speaker associated with the mobile computing device.

According to yet other embodiments, a method is described for deterring signal attenuation in a mobile computing device. The method includes at least determining an obstruction to an antenna associated with the mobile computing device and providing a notification indicating the obstruction. Determining the obstruction may be performed by a touch transducer that detects that a hand of the user is covering an antenna of the mobile computing device. The antenna may be any suitable antenna and may operate within any suitable frequency bands now available or available in the future for wireless communication.

The notification may be a haptic notification and may include vibrating the mobile computing device. In other instances, the notification is audible.

The method may also determine the presence of an obstruction by using a camera associated with the mobile computing device. Alternatively, determining the obstruction may be based on detecting a reduction in signal strength.

According to some embodiments, a method includes locating an antenna in a mobile computing device in proximity to a first edge of the mobile computing device; locating one or more heat generating components adjacent the antenna; and causing the one or more heat generating components to generate heat, the heat causing a warming of the first edge of the mobile computing device adjacent the antenna to deter a user from placing an obstruction at the first edge of the mobile computing device.

The method may further include providing a passive indication on an outside surface of the mobile computing device proximate to the antenna, such as a different color or texture on the area adjacent the antenna.

The method may further include determining the presence of an obstruction to a signal broadcast by the antenna, and may also generate a notification indicating the presence of the obstruction. An escalated notification may be generated based on a continued detection of the obstruction.

The method may further include increasing the signal strength of the signal broadcast by the antenna. Increasing the signal strength may be done in an attempt to overcome the signal attenuation caused by the continued presence of the obstruction. These, and other features, will be further described by reference to the attached figures.

FIG. 1 illustrates an overview of a system 100 for detecting and deterring signal attenuation emanating from an antenna 102. The antenna 102 may be any type of antenna, such as for example, monopole, dipole, horn, planar, folded, folded inverted, planar inverted-F (PIFA), phased array, right-hand circularly polarized, ceramic, or printed board type, or any other antenna that may be incorporated into a mobile computing device 104.

In various implementations, the mobile computing device 104 may be any sort of computing device known in the art that is capable of communicating over one or more frequency bands. Examples of suitable mobile computing devices 104 include a PC, a laptop computer, a tablet computer, a telecommunication device, a smartphone, a cell phone, a personal digital assistant (PDA), a media player, a media center device, a personal video recorder (PVR), an electronic book reader, a camera, a video game console, a kiosk, a wearable computing device, a virtual reality headset, smart glasses, a gaming device, an electronic device for inclusion in vehicles, a gaming device, or any other sort of device.

The mobile computing device 104 can be configured with hardware and software necessary for data communication and voice communication. The mobile computing device 104 can have a heat sink 106 to transfer heat generated from components within the mobile computing device 104, such as a battery 108 or processor, to the environment.

In general, electronic components within the mobile computing device 104 may generate heat, such as a processor, memory, battery, GPS devices, amplifiers, and other such electronic components that may be implemented in a mobile computing device 104. According to one embodiment, a heat sink 106 can be provided in the general area of the antenna 102. In some instances, the heat sink 106 may be internal to the mobile computing device 104, or it may be external to the mobile computing device 104, or in some example, may have a portion of the heat sink 106 that protrudes through a case 112 of the mobile computing device 104. Alternatively, the heat sink 106 may be in thermal communication with one or more heat generating components and also in physical contact with the case 112 of the mobile computing device 104. In this way, the heat 110 generated by the electronic components within the mobile computing device 104 can not only be transferred away from the electronic components, thereby increasing their useful lifespan, but the heat can be directed to a location that is within the vicinity of the antenna 102.

In some cases, the heat 110 that is transferred away from the heat generating components of the mobile computing device 104 causes an area of the mobile computing device 104 within the vicinity of the antenna 102 to become warm, or even hot, to the touch. This may cause the mobile computing device 104 to be uncomfortable to hold in such a way that a user's hand would interfere with the wireless signal 114 emanating from the antenna. At the least, the temperature of the mobile computing device 104 in the vicinity of the antenna 102 may alert a user that they are holding the mobile computing device 104 improperly, and might be interfering with the wireless signal 114.

This is a passive measure that not only preferentially directs heat away from the electronic components to an area of the mobile computing device 104 that can help alleviate issues created by the user holding the mobile computing device 104 in such a way that they are likely interfering with the wireless signal 114, but has the added benefit of heat management within the mobile computing device 104 to increase component longevity.

Heat may also be preferentially directed toward the area of the antenna by locating the heat generating components near the antenna. For instance, an amplifier and a processor may primarily be responsible for heat generation with the mobile computing device and may preferentially be located adjacent to the antenna so the heat produced by those components warms the area of the mobile computing device near the antenna. Of course, other heat generating components could likewise, or alternatively, be located near the antenna. Other heat conductive components may be implemented to transfer heat from the heat generating components to an area adjacent the antenna. As an example, a heat generating component may be positioned relatively far from the antenna, yet a heat transfer component may be in thermal communication with the heat generating component and may absorb heat generated by the heat generating component and transfer the heat to a heat sink located near the antenna.

As mobile computing devices 104 incorporate short wavelength antenna systems, such as for example, a phased-array antenna, signal attenuation can be a problem in degrading the QoS that a customer may expect from their mobile computing device 104. The QoS is, in some part, related to the signal strength that is sent and received from the mobile computing device 104. If the wireless signal 114 is interfered with, it can be attenuated and its power density is reduced. The following discloses several ways to detect whether the signal is attenuated and also describes several ways to deter the signal attenuation. The signal attenuation determent measures may be either passive, active, or a combination.

Figure 2:
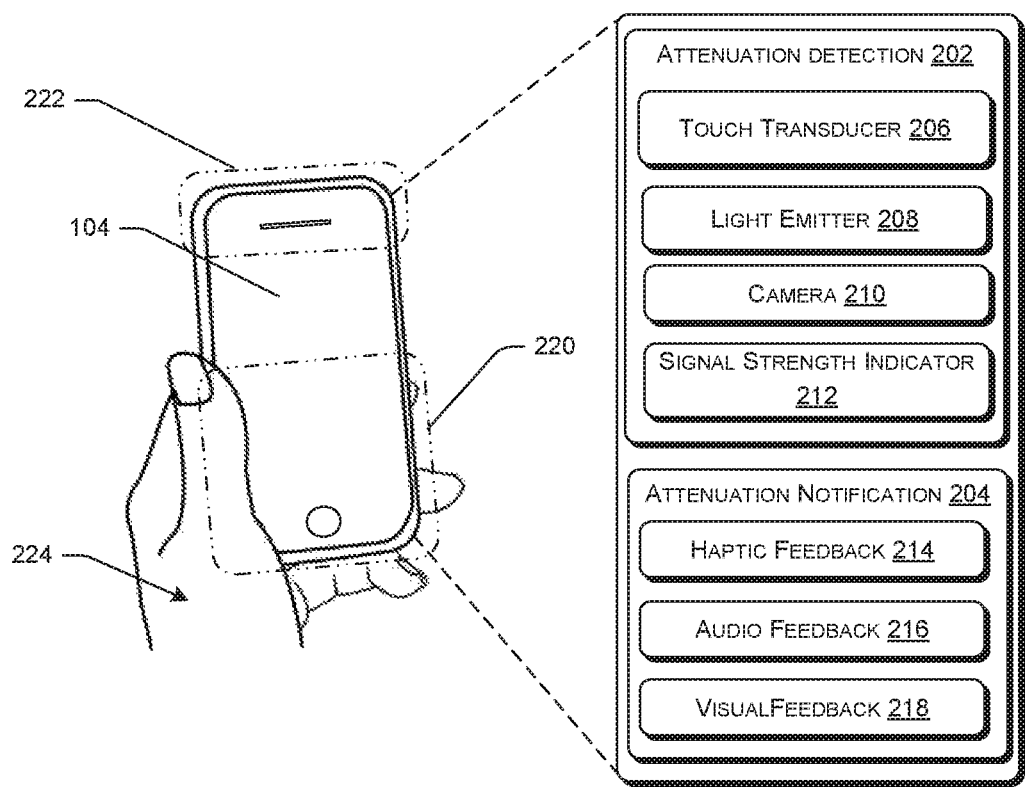
FIG. 2 illustrates a mobile computing device having systems for detecting obstructions and deterring the obstructions.

FIG. 2 illustrates a mobile computing device 104 having various attenuation detection 202 capabilities and several attenuation notification 204 capabilities. For instance, the mobile computing device may be configured with hardware and software to implement a touch transducer 206, a light emitter 208, a camera 210 and a signal strength indicator 212. Furthermore, the mobile computing device 104 may be configured with hardware and software to implement attenuation notification 204 measures such as haptic feedback 214, audio feedback 216, and visual feedback 218.

In general, when a user holds a mobile computing device 104 during voice communication, the user holds the mobile computing device 104 about the lower half 220 of the device, as shown in FIG. 2. Holding the mobile computing device 104 in this orientation allows the user to bring the mobile computing device to a comfortable position for voice communications, in which a speaker of the mobile computing device 104 is brought in proximity to the ear of the user, and a microphone of the mobile computing device 104 is brought in proximity to the mouth of the user.

In many implementations, mobile computing devices 104 may generally position antennas or antenna systems within the mobile computing device toward the upper half 222 of the device so that when the mobile computing device 104 is held in a natural orientation, the antenna is not obstructed by the hand 224 of the user and generally points upwardly when a user is standing or sitting. This orientation provides line of sight for the antenna of the mobile computing device 104 to send and receive wireless signals. However, in some instances, a user may not hold the phone in this orientation, but rather, may unconventionally hold the phone by the upper half 222 and thereby the hand 224 of the user may block the wireless signal emanating from the antennas within the mobile computing device 104.

To alleviate the condition in which attenuation of the signal is induced by the user, several detection mechanisms may be used. For example, the touch transducer 206 may detect one or more locations at which the user is touching the mobile computing device 104. For instance, many mobile computing devices 104 are configured with touch screens, such as resistive, capacitive, surface acoustic wave, infrared, or inductive touchscreen, or a combination of technologies. In a similar way, the touchscreen of the mobile computing device 104 may extend to cover the area generally adjacent to the antenna. Thus, when a user holds the mobile computing device 104 in such a way that interferes with the antenna, the touch screen is able to detect this condition.

In one embodiment, a separate touch sensor is provided in the vicinity of the antenna that may be independent of the primary touch-sensitive display of the mobile computing device 104 and may use a similar or dissimilar touch-sensitive technology. In either case, the mobile computing device 104 is able to determine when a user is holding the mobile computing device 104 in such a way that the wireless signal may be attenuated.

Another method for detecting signal attenuation is use of a light emitter 208. Many mobile computing devices 104 are manufactured with a light, such as a light emitting diode, which may be used for illumination such as for a camera flash or as a flashlight. In some cases, the mobile computing device 104 may activate the light emitter 208 and detect reflected light, such as from a hand 224 of a user that is covering the light emitter 208. The light emitter 208 may be placed in proximity to the antenna and where a hand 224 of a user covers the light emitter 208, some of the light emitted may be reflected back to the mobile computing device 104, which may be detected, such as by an imaging sensor.

The camera 210 includes an imaging sensor that is able to capture light and form images. As described, the camera 210 may detect light reflected from the light emitter 208 by the hand 224 of a user, thereby indicating that the user is holding the mobile computing device 104 in a way that may interfere with the wireless signal. The camera 210 may additionally capture one or more images that depict the hand 224 of the user in proximity of the antenna. While the mobile computing device 104 may conduct image analysis such as by running one or more feature recognition algorithms to determine that the hand 224 of the user is interfering with the antenna signal, the mobile computing device 104 may also determine that a captured image from the camera 210 is out of focus caused by an object positioned adjacent to the mobile computing device 104 at a distance that is shorter than the minimum focal distance of a lens of the camera. In this way, the mobile computing device 104 may determine that there is an obstruction positioned close to the mobile computing device 104, such as a hand 224 of a user holding the mobile computing device 104 improperly.

The signal strength indicator 212 may be used to indicate the signal strength of the wireless signal either sent from the mobile computing device 104 or received by the mobile computing device 104. In some cases, the signal strength sent by the mobile computing device 104 can be received by a transceiver, and the transceiver may send a signal back to the mobile computing device 104 that, among other things, may indicate the signal strength that is being sent by the mobile computing device 104. In this way, any attenuation of the signal being sent by the mobile computing device 104 can be detected and communicated to the mobile computing device 104. The mobile computing device 104 may then be configured to confirm whether the signal attenuation is user-induced, such as by implementing one or more other detection techniques.

Once the mobile computing device 104 determines that the wireless signal is experiencing attenuation, one or more notifications may be provided to help alleviate the condition responsible for the signal attenuation. For instance, the mobile computing device 104 may provide haptic feedback 214 to the user. This may be in the form of a vibration, or some other motion within the mobile computing device 104 that indicates to the user that the signal is being attenuated by the user. The notification may also be passive, such as by providing a texture or using a different material on the surface of the mobile computing device 104 at an area within the vicinity of the antenna. In this way, the user may feel the dissimilar texture or material to be reminded that holding the mobile computing device 104 in this location may interfere with the wireless signal. The mobile computing device 104 may also be configured to conduct heat from the heat-generating components within the mobile computing device 104 to a location proximate the antenna. In this way, the area within the vicinity of the antenna may become warmer than other areas of the mobile computing device 104 which may indicate to the user to refrain from holding the mobile computing device 104 in this area.

Audio feedback 216 may also, or alternatively, be used to provide an indication to the user that the signal is being interfered with. For instance, the mobile computing device 104 may emit an audible beep, siren, wail, note, chime, or some semantic notification that the user can hear as a reminder that the user is holding the mobile computing device 104 in a way that may interfere with the signal.

In some embodiments, visual feedback 218 may be used to indicate that the user may be interfering with the signal. Some examples of visual feedback 218 include, without limitation, activating the light emitter 208, emitting a predetermined color of the light being emitted by the light emitter, providing a visual notification on a display screen of the mobile computing device 104, providing the outside case of the mobile computing device 104 with a different color at the location of the antenna, or some other visual feedback 218 or combination of visual feedbacks may be utilized. A notification provided on the display screen of the mobile computing device 104 may be textual or include images, or both. In some cases, an image may be provided illustrating the preferred way that the phone should be held to remove the obstruction.

FIG. 3A illustrates one example of providing haptic feedback to a user to indicate that the user may be introducing an obstruction that has the potential to attenuate the wireless signal. The mobile computing device 104 may be configured with a surface texture 302 that the user can feel when the user holds the mobile computing device 104 in this location. The surface texture may be configured as a series of protrusions, valleys, striations, grooves, surface roughness, surface smoothness, or some other configuration that a user can feel. The surface texture 302 may be provided in the general area of the antenna 304. Of course, while the illustration shows the antenna disposed at one specific location of the mobile computing device 104, the antenna may be disposed at other areas, and may be disposed at multiple areas of the mobile computing device 104. In some cases, the antenna may be disposed along an entire edge, corner, or surface of the mobile computing device 104 and the detection and determent methods described can be implemented anywhere the antenna is positioned.

FIG. 3B illustrates a mobile computing device 104 in which one or more of a camera 306 or a light emitter 308, or both, are disposed within the area of the antenna 304. In embodiments configured in this way, the light emitter 308, the camera 306, or both may be used to detect when an obstruction may be interfering with the wireless signal emanating from the antenna 304. The camera may capture one or more images that may be analyzed to determine that an obstruction, such as a hand of a user, may be interfering with the antenna signal. The camera may capture an image that is mostly dark or out of focus, which may also indicate the presence of an obstruction in the vicinity of the antenna.

The light emitter 308 may also be used to detect the presence of an obstruction. The light emitter 308 may flash and light that is reflected back to a light detector, such as the camera 306 or a separate light detector, may indicate an obstruction in the vicinity of the antenna. The light detector may capture an intensity of the reflected light, may determine the time between light emission and reflection, or may use some other method to determine that an obstruction is likely interfering with the antenna signal.

Figure 4:
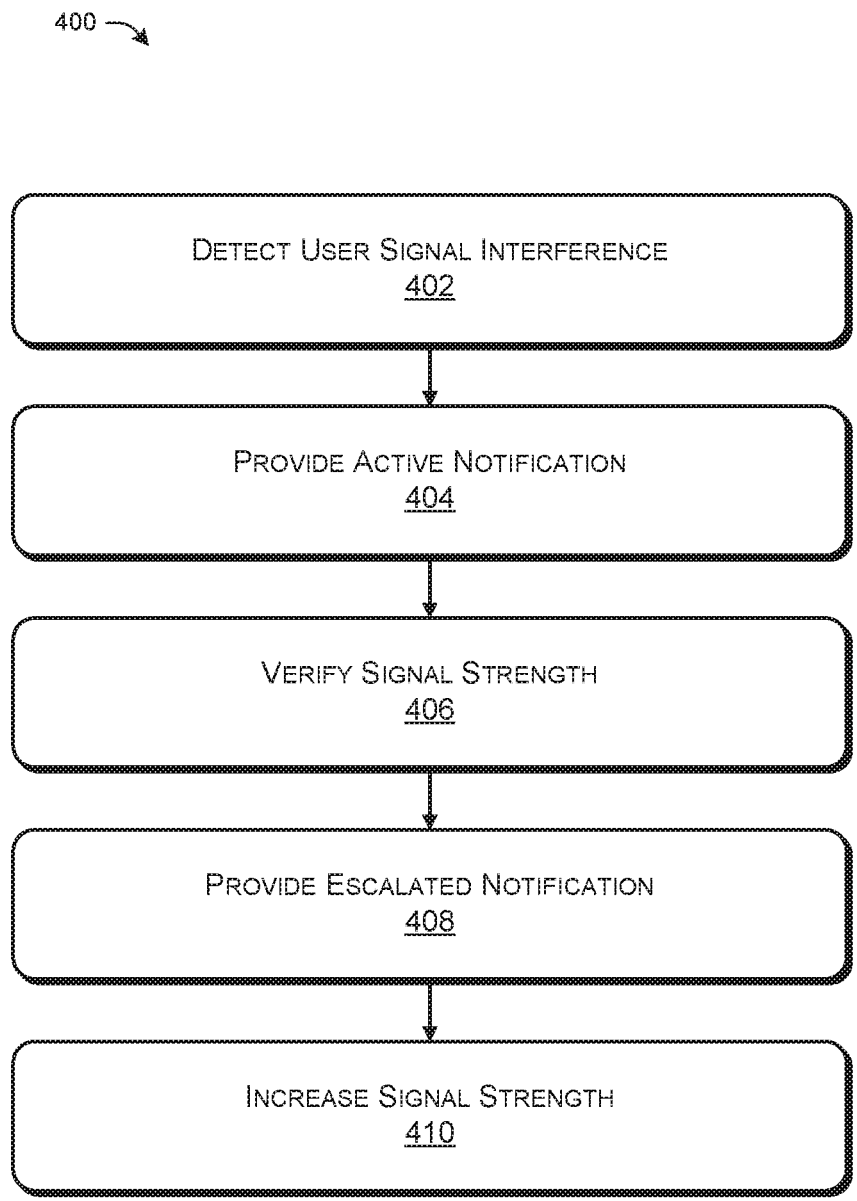
FIG. 4 is a flow diagram illustrating a method of detecting and deterring wireless signal attenuation caused by a user-induced obstruction.

FIG. 4 is a flow diagram showing several illustrative routines for detecting and deterring signal attenuation, according to embodiments disclosed herein. It should be appreciated that the logical operations described herein with respect to FIG. 4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. Moreover, it should be appreciated that the described operations may be performed on multiple computing systems, including systems operated or controlled by various parties. It should also be appreciated that more or fewer operations may be performed than shown in the figures and described herein. These operations may also be performed in parallel, or in a different order than those described herein.

With reference to FIG. 4, an example process 400 for detecting and deterring signal attenuation is illustrated. At block 402, signal interference is detected. The interference may be introduced by a user and may be detected through any one or more methods such as, for example, a touch sensor, a reduction in signal strength, an image, or reflected light. The signal interference may be cause by any of a number of objects, such as a user's hand, umbrella, hat, clothing, or some other object that blocks the antenna.

At block 404, the mobile computing device may provide an active notification to notify a user of the introduced signal attenuation. The active notification may include one or more of haptic feedback, audio feedback, or visual feedback, or a combination. These active notifications generally refer to an action that the mobile computing device takes in order to notify the user of the signal attenuation, and may be provided in addition to the passive feedback measures, such as surface texture, surface temperature, or surface color associated with an area of the mobile computing device adjacent to the antenna.

At block 406, the signal strength is verified. This may be done by determining that the obstruction is no longer present, such as by using the touch sensor to determine that the user's hand is no longer covering the antenna. The signal strength may likewise be verified by a detected signal strength, or by some other measure or combination of measures.

At block 408, escalated notifications may be provided. That is, where the mobile computing device 104 determines that the obstruction has not been removed and the signal may continue to be attenuated, another alert may be provided to the user. For instance, where the mobile computing device initially provided a visual indication of the signal attenuation, such as by activating the light emitter, and the user either missed or ignored the notification, another notification, such as an audio notification can be provided to the user. Of course, other notifications may be provided to escalate the issue to the user's attention. An audio feedback notification may be repeated, or made louder, or may be combined or replaced with haptic feedback such as vibration of the mobile computing device.

Other forms of escalation are contemplated, such as repeating a notification, combining two or more notifications, increasing the intensity or frequency of the notification, or some other way to alert the user that an obstruction may be interfering with the signal.

At block 410, the signal strength may be increased. That is, where the signal attenuation may interfere with the QoS of the user, the mobile computing device may proactively increase the signal strength to preserve the QoS for the user. This step is optional and may be predicated upon other factors, such as the current use of the mobile computing device or the remaining battery life of the mobile computing device. For example, where the user is not using the mobile computing device to send or receive voice or data communications, yet is nevertheless obstructing the antenna, there may be no need to increase the signal strength or even provide any active notifications to the user indicating that there is an obstruction of the antenna.

Figure 5:
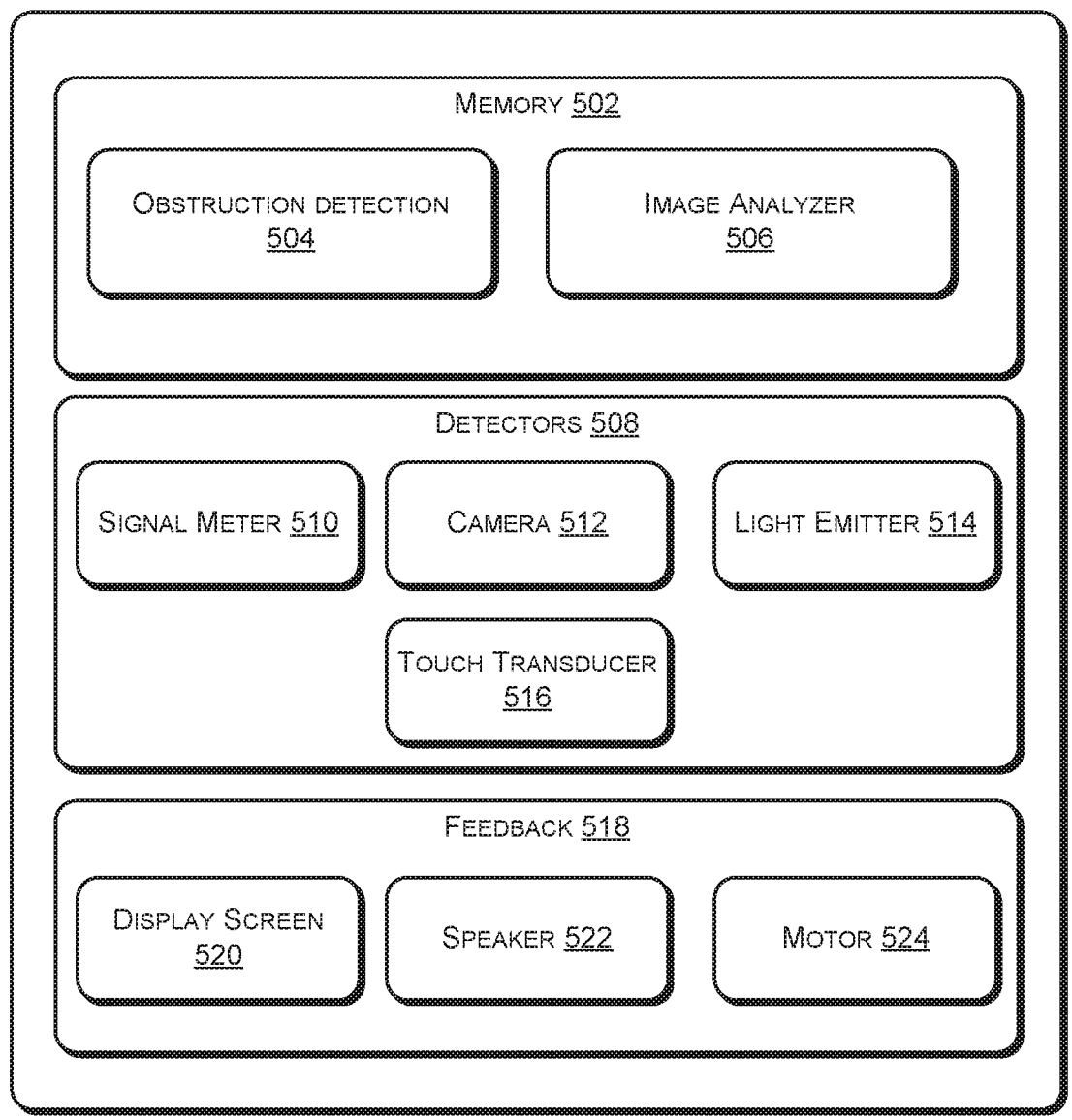
FIG. 5 is an example of a user equipment utilizing various signal attenuation detection and determent features described herein.

As shown in FIG. 5, the systems and methods can be used in conjunction with a user equipment that can comprise a variety of electronic devices. For clarity, the user equipment has been described generally as a mobile computing device, and in some cases, as a cell phone or smart phone. One of skill in the art will recognize; however, that the system 500 can also be used with a variety of other electronic devices, such as, for example, tablet computers, laptops, desktops, and other network (e.g., cellular or IP network) connected devices from which a cellular voice and data can be accessed. Indeed, many devices capable of wireless and cellular communications (e.g., cellular, microwave, Wi-Fi, etc.) can be used with the system 500 describe herein including the so-called "Internet of Things," to include appliances, cars, smart meters, and so on.

The user equipment 500 may include memory 502 that stores instructions, programs, routines, applications, and so forth that allow the user equipment 500 to carry out various functions and control the hardware components that form a part of the user equipment 500. As a non-limiting example, obstruction detection 504 instructions may be stored in memory and executable by one or more processors of the user equipment 500. Additionally, an image analyzer 506 may be stored in the memory 502 and executable to provide image analysis functionality.

The user equipment 500 may additionally have a variety of hardware components that can be used as detectors 508 of obstructions, such as a signal meter 510, a camera 512, a light emitter 514, and a touch transducer 516 to name a few.

The obstruction detection 504 may function in a variety of ways to detect when there is an obstruction to the antenna that may attenuate the wireless signal. For example, the obstruction detection may rely on a signal strength determined by the signal meter 510. The obstruction detection 504 may alternatively or additionally activate the camera 512 to capture an image that depicts any objects external to the user equipment 500 that may block the antenna. In conjunction with the camera, the image analyzer 506 may receive an image captured by the camera 512 and analyze the image to determine whether there are obstructions that may have a tendency to attenuate the wireless signal.

The obstruction detection 504 may further activate a light emitter 514, which may flash or blink any of a various color or intensity of light. The light from the light emitter 514 may be sensed by the camera 512 and used to determine whether an obstruction is in front of the light emitter, which may indicate that the obstruction is also blocking the antenna.

A variety of hardware components may also be implemented to provide feedback 518 pursuant to the detection of an obstruction to the wireless signal. As non-limiting examples, a display screen 520 can be used to provide visual feedback, either in the form of text, images, animations, video clips, or a combination. A speaker 522 may be used to provide audible feedback, such as a chime, beep, spoken instructions or any other type of audible feedback. A motor 524 may also be activated to provide haptic feedback. The motor 524 may any suitable motor, such as a rotational vibration motor having an off-balance weight distribution of a spinning counterweight. The motor 524 may alternatively be a linear oscillating vibrator, or some other type of device that provides haptic feedback to a user to alert the user to the presence of the obstruction. Of course, the feedback mechanisms may be used in conjunction with one another, and are not necessarily mutually exclusive. For instance, a vibration may alert the user to look at the display screen which can display a visual notification of the obstruction. Of course, the feedback 518 may be used in any combination or in any order to provide notifications to the user.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for deterring signal strength attenuation from an antenna, comprising:
   a mobile computing device having a housing, and further comprising:
      one or more heat generating components disposed within the housing;
      a phased-array antenna disposed within the housing;
      a heat sink disposed within the housing adjacent the phased-array antenna and in thermal communication with the one or more heat generating components and configured to transfer heat away from the one or more heat generating components and cause an increase in a temperature of the mobile computing device at a location on the housing adjacent the phased-array antenna; and
      one or more processors and memory storing instructions that, when executed by the one or more processors, cause the system to:
      detect an obstruction to a signal emanating from the phased-array antenna; and
      provide a notification indicating a presence of the obstruction;
      determine that the obstruction has not been removed; and
      at least partly in response to determining that the obstruction has not been removed, provide an escalated notification, the escalated notification being one or more of a different sensory notification, a combination of multiple notifications, or the notification having a different intensity or frequency.

2. The system of claim 1, further comprising a touch sensor configured to detect a touch on the housing adjacent the phased-array antenna.

3. The system of claim 1, wherein the notification is a visual notification and is one or more of a light emanating from a light emitter associated with the mobile computing device or a notice provided on a display of the mobile computing device.

4. The system of claim 1, wherein the notification is an audible notification delivered from a speaker associated with the mobile computing device.

5. The system of claim 1, further comprising a first surface texture on the housing and a second surface texture on the housing, the second surface texture being located adjacent the phased-array antenna and providing a different tactile sensation than the first surface texture.

6. The system of claim 1, wherein determining the obstruction to the signal emanating from the phased-array antenna is further based at least in part upon detecting a reduction in signal strength.

7. A method for deterring signal attenuation in a mobile computing device, comprising:
   locating an antenna in the mobile computing device, the antenna in proximity to a first edge of the mobile computing device;
   locating one or more heat generating components adjacent to the antenna;
   configuring the mobile computing device to determine an obstruction to a signal broadcast by the antenna;
   determining the obstruction to the antenna is associated with the mobile computing device, wherein determining the obstruction is performed by:
      a touch sensor configured to detect a touch on a housing adjacent the antenna, or
      a camera associated with the mobile computing device;
   providing a notification indicating the obstruction; and
   causing the one or more heat generating components to generate heat to warm of the first edge of the mobile computing device adjacent to the antenna to deter a user from placing the obstruction at the first edge of the mobile computing device.

8. The method of claim 7, wherein the notification is a haptic notification and includes vibrating the mobile computing device.

9. The method of claim 7, wherein the notification is audible.

10. The method of claim 7, wherein determining the obstruction is further based at least in part upon detecting a reduction in signal strength.

11. The method of claim 7, further comprising providing a notification indicating a presence of the obstruction.

12. The method of claim 11, further comprising
   determining that the obstruction has not been removed; and
   at least partly in response to determining that the obstruction has not been removed, providing an escalated notification, the escalated notification being one or more of a different sensory notification, a combination of multiple notifications, or the notification having a different intensity or frequency.

13. A method, comprising:
   locating an antenna in a mobile computing device in proximity to a first edge of the mobile computing device;
   locating one or more heat generating components adjacent to the antenna;
   configuring the mobile computing device to determine an obstruction to a signal broadcast by the antenna; and
   wherein heat generated by the heat generating components causes a warming of the first edge of the mobile computing device adjacent to the antenna to deter a user from placing the obstruction at the first edge of the mobile computing device.

14. The method of claim 13, further comprising providing a passive indication on an outside surface of the mobile computing device proximate to the antenna.

15. The method of claim 14, where the passive indication is one or more of a different color or texture.

16. The method of claim 13, further comprising generating a notification indicating a presence of the obstruction.

17. The method of claim 16, further comprising generating an escalated notification based at least in part on a continued detection of the obstruction.

18. The method of claim 17, further comprising increasing a signal strength of the signal broadcast by the antenna.

19. The method of claim 16, further comprising:
   determining that the obstruction has not been removed; and
   providing, at least partly in response to determining that the obstruction has not been removed, an escalated notification, the escalated notification being one or more of a different sensory notification, a combination of multiple notifications, or the notification having a different intensity or frequency.

20. The method of claim 13, wherein configuring the mobile computing device to determine the obstruction comprising configuring a touch sensor to detect a touch on a housing of the mobile computing device.

* * * * *